United States Patent
Kashitani

(10) Patent No.: US 12,024,437 B2
(45) Date of Patent: Jul. 2, 2024

(54) METHOD FOR CONTINUOUSLY GENERATING SILICON MONOXIDE GAS

(71) Applicant: OSAKA Titanium technologies Co., Ltd., Hyogo (JP)

(72) Inventor: Yusuke Kashitani, Hyogo (JP)

(73) Assignee: OSAKA Titanium technologies Co., Ltd., Hyogo (JP)

( * ) Notice: Subject to any disclaimer, the term of this patent is extended or adjusted under 35 U.S.C. 154(b) by 0 days.

(21) Appl. No.: 17/563,129

(22) Filed: Dec. 28, 2021

(65) Prior Publication Data

US 2023/0202848 A1 Jun. 29, 2023

(51) Int. Cl.
*C01B 33/113* (2006.01)

(52) U.S. Cl.
CPC .... *C01B 33/113* (2013.01); *C01B 2210/0009* (2013.01)

(58) Field of Classification Search
CPC .............. C01B 33/113; C01B 2210/0009
See application file for complete search history.

(56) References Cited

U.S. PATENT DOCUMENTS

| | | | | |
|---|---|---|---|---|
| 5,096,685 A * | 3/1992 | Funahashi | .............. | B82Y 30/00 |
| | | | | 423/325 |
| 10,046,973 B2 * | 8/2018 | Jung | ........................ | B01J 19/18 |
| 2015/0110699 A1 | 4/2015 | Jung et al. | | |

FOREIGN PATENT DOCUMENTS

| | | | | |
|---|---|---|---|---|
| JP | 05-213606 | | 8/1993 | |
| JP | 2003-119017 | | 4/2003 | |
| JP | 2012-197207 | | 10/2012 | |
| JP | 2014-084264 | | 5/2014 | |
| JP | 2016-519046 | | 6/2016 | |
| TW | 202009216 A | * | 3/2020 | ........... C01B 33/113 |

OTHER PUBLICATIONS

Fujita et al. TW202009216A English Translation (Year: 2020).*

\* cited by examiner

*Primary Examiner* — Samir Shah
*Assistant Examiner* — Jordan W Taylor
(74) *Attorney, Agent, or Firm* — Clark & Brody LP

(57) ABSTRACT

In a method for continuously generating silicon monoxide (SiO) gas, wherein a silicon monoxide gas-generating raw material in a raw material supply unit is continuously charged into a reaction chamber RM, an inert gas is flowed through the raw material supply unit so as to be directed toward the charging direction of the silicon monoxide gas-generating raw material. The method for continuously generating silicon monoxide gas prevents a decrease in yield of the silicon monoxide (SiO) gas-generating raw material.

3 Claims, 1 Drawing Sheet

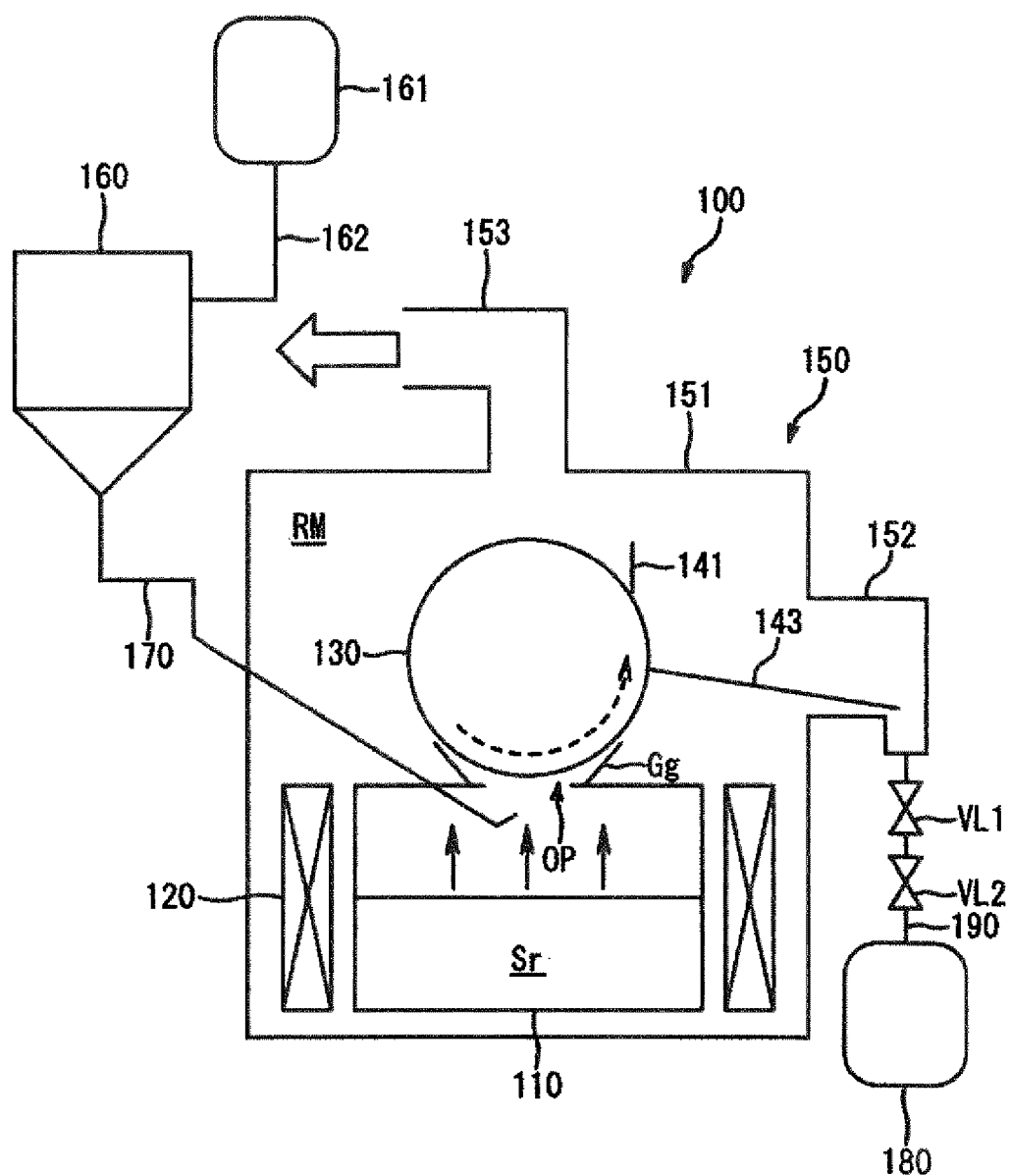

METHOD FOR CONTINUOUSLY GENERATING SILICON MONOXIDE GAS

TECHNICAL FIELD

The present invention relates to a method for continuously generating silicon monoxide (SiO) gas.

BACKGROUND ART

In the past, "An apparatus for manufacturing SiO, comprising: a reaction unit configured to receive a SiO-making material and bring the received material into reaction by heating to generate a SiO gas; and a collecting unit configured to maintain an internal temperature lower than an internal temperature of the reaction unit, the collecting unit including a rotating member in an inner space thereof, wherein the collecting unit collects a SiO vapor-deposit by introducing the SiO gas generated by the reaction unit through an inlet formed at least at one side thereof and allowing the introduced SiO gas to be vapor-deposited to a surface of the rotating member" has been proposed (for example, see Unexamined Japanese Patent Publication No. 2016-519046).

PRIOR ART DOCUMENT

Patent Document

[PATENT DOCUMENT 1] Unexamined Japanese Patent Publication No. 2016-519046

SUMMARY OF THE INVENTION

Problem to be Solved by the Invention

In the apparatus for manufacturing SiO described in Patent Document 1, a supply unit for storing a SiO-making material and supplying the SiO-making material to the reaction unit is configured. Then, the SiO-making material in the supply unit is automatically (continuously) charged into the reaction unit, and silicon monoxide (SiO) gas is generated. However, in this case, a part of the generated silicon monoxide gas may flow back into the supply unit and vapor-deposit in the supply unit. If the silicon monoxide gas is vapor-deposited and accumulated on the supply unit, the SiO-making material tends to stay in the supply unit. As a result, the yield of the SiO-making material may decrease.

It is an object of the present invention to provide a method for continuously generating silicon monoxide gas capable of preventing a decrease in yield of a silicon monoxide gas-generating raw material.

Means for Solving the Problems

In a method for continuously generating silicon monoxide gas according to a first aspect of the present invention, when a silicon monoxide (SiO) gas-generating raw material in a raw material supply unit is continuously charged into a reaction chamber, inert gas is flowed through the raw material supply unit so as to be directed toward the charging direction of the silicon monoxide gas-generating raw material.

According to the above method, it is possible to prevent the silicon monoxide gas from flowing back into the raw material supply unit and vapor-depositing in the raw material supply unit, and it is possible to prevent the silicon monoxide gas-generating raw material from staying in the raw material supply unit. Therefore, in this method for continuously generating silicon monoxide gas, it is possible to prevent a decrease in yield of the silicon monoxide gas-generating raw material. Here, the silicon monoxide gas-generating raw material is, for example, "a mixed powder of silicon (Si) and silicon dioxide ($SiO_2$)", "a mixed powder of silicon (Si) and a silicate such as lithium silicate ($Li_2Si_2O_5$ or the like)", or the like. The inert gas is, for example, rare gas (helium (He), neon (Ne), argon (Ar), krypton (Kr), xenon (Xe), or the like), nitrogen ($N_2$) gas, carbon dioxide ($CO_2$) gas, or the like, and is preferably argon (Ar).

The method for continuously generating silicon monoxide gas according to a second aspect of the present invention is the method for continuously generating silicon monoxide gas according to the first aspect, wherein a flow rate of the inert gas is controlled so that a pressure in the reaction chamber becomes within a range of 0 Pa or more and 100 Pa or less.

According to the above method, the flow rate of the inert gas is controlled so that the pressure in the reaction chamber is within a range of 0 Pa or more and 100 Pa or less. Therefore, in this method for continuously generating silicon monoxide gas, a reaction in which the silicon monoxide gas is generated proceeds appropriately, and the silicon monoxide gas can be continuously generated.

BRIEF DESCRIPTION OF THE DRAWINGS

FIG. 1 is a schematic view of an apparatus for manufacturing active material particles using a method for continuously generating silicon monoxide gas according to an embodiment of the present invention.

DESCRIPTION OF THE PREFERRED EMBODIMENTS

In the present embodiment, as the silicon monoxide gas-generating raw material Sr for generating the silicon monoxide (SiO) gas, for example, "a mixed powder of silicon (Si) and silicon dioxide ($SiO_2$)" or "a mixed powder of silicon (Si) and a silicate such as lithium silicate ($Li_2Si_2O_5$ or the like)" is used. "The mixed powder of silicon (Si) and silicon dioxide ($SiO_2$)" is used when manufacturing silicon oxide particles, and is heat-treated to generate silicon monoxide gas. "The mixed powder of silicon (Si) and a silicate such as lithium silicate ($Li_2Si_2O_5$ or the like)" is used when metal element-containing silicon oxide particles are manufactured, and is heat-treated to generate silicon monoxide gas containing a lithium (Li) element. Incidentally, lithium silicate is a composite oxide of lithium oxide ($Li_2O$) and silicon dioxide ($SiO_2$), and it is preferable that the molar ratio is $Li_2O/SiO_2<2$, more preferable that the molar ratio is $Li_2O/SiO_2\leq1$, and particularly preferable that the molar ratio is $Li_2O/SiO_2\leq0.5$. Further, the metal element may be an element capable of reducing silicon monoxide and stabilizing oxygen, such as an alkali metal such as sodium (Na) other than lithium (Li), or an alkaline earth metal such as magnesium (Mg) and calcium (Ca).

Then, silicon monoxide gas is generated by the method for continuously generating silicon monoxide gas according to the embodiment of the present invention, and the active material particles are manufactured through a process described later. As such active material particles, for example, silicon oxide particles or metal element-containing silicon oxide particles used as an active material of an electrode (particularly, a negative electrode) of a lithium ion secondary battery is used.

Incidentally, in order to finally manufacture active material particles using the method for continuously generating silicon monoxide gas according to the embodiment of the present invention, it is preferable to use a vapor-deposition apparatus 100 as shown in FIG. 1. The vapor-deposition apparatus 100 is excellent from the viewpoint of suppression of manufacturing cost and the like. Hereinafter, the vapor-deposition apparatus 100 will be described in detail.

The vapor-deposition apparatus 100, as shown in FIG. 1, mainly, comprises a crucible 110, a heater 120, a vapor-deposition drum 130, a scraper 141, a particle guide 143, a chamber 150, a raw material supply hopper 160, an inert gas tank 161, an inert gas charging line 162, a raw material introducing pipe 170, a collection container 180, a first valve VL1 and a second valve VL2.

As shown in FIG. 1, the crucible 110 is a heat resistant container having an opening in the central portion of the top wall and is installed in the chamber 150. A through hole (not shown) is formed in one portion around the top wall of the crucible 110, and the raw material introducing pipe 170 is inserted into the through hole. That is, the silicon monoxide gas-generating raw material Sr in the raw material supply hopper 160 is supplied to the crucible 110 through the raw material introducing pipe 170. Further, a gas guide Gg is disposed on the upper side of the top wall of the crucible 110. The gas guide Gg is a member for guiding the silicon monoxide gas generated in the crucible 110 to the vapor-deposition drum 130, and is installed on the upper surface of the top wall so as to surround the central portion of the top wall as shown in FIG. 1.

The heater 120 is for heating the crucible 110 at a high temperature, and is disposed so as to take in the outer periphery of the crucible 110.

The vapor-deposition drum 130 is, for example, a cylindrical horizontal drum. As shown in FIG. 1, the vapor-deposition drum 130 is disposed above the opening OP of the top wall of the crucible 110 and the lower portion of the vapor-deposition drum 130 is surrounded by the gas guide Gg. Then, the vapor-deposition drum 130 is driven to rotate in one direction by a driving mechanism (not shown). Incidentally, a temperature controller (not shown) for maintaining the outer peripheral surface at a constant temperature is provided on the vapor-deposition drum 130. The temperature controller cools the outer peripheral surface temperature of the vapor-deposition drum 130 to a temperature suitable for vapor-deposition of the vapor-deposition source gas by a cooling medium supplied from the outside. In addition, the outer peripheral surface temperature of the vapor-deposition drum 130 may affect the crystallinity of the deposit accumulated on the deposit remaining on the vapor-deposition drum. If this temperature is too low, the tissue structure of the deposit may become too sparse, and on the contrary, if this temperature is too high, crystal growth due to the disproportionation reaction may proceed. When the silicon monoxide gas is vapor-deposited, this temperature is preferably 900° C. or less, more preferably within a range of 150° C. or more and 800° C. or less, and particularly preferably within a range of 150° C. or more and 700° C. or less.

The scraper 141 is a member that serves to scrape a thin film formed on the vapor-deposition drum from the vapor-deposition drum 130. The scraped-off thin film pieces (active material particles) fall into the particle guide 143. Further, the material of the scraper 141 affects impurity contamination of the active material particles. From the viewpoint of suppressing the affect, the material of the scraper 141 is preferably stainless steel or ceramics, and particularly preferably ceramics. The scraper 141 is preferably not in contact with the outer peripheral surface of the vapor-deposition drum 130. This is because the impurity contamination that may occur due to direct contact between the vapor-deposition drum 130 and the scraper 141 can be prevented from being mixed into the collected active material particles.

The particle guide 143 is, for example, a vibrating conveying member. As shown in FIG. 1, the particle guide 143 is disposed so as to be inclined downward from the vicinity of the vapor-deposition drum 130 toward a collection portion 152 of the chamber 150, and receives the thin film pieces scraped off by the scraper 141 disposed above to send it to the collection portion 152 of the chamber 150.

As shown in FIG. 1, the chamber 150 is mainly formed of a chamber body portion 151, a collection portion 152, and an exhaust pipe 153. As shown in FIG. 1, the chamber body portion 151 is a box-shaped portion having a deposition chamber RM inside, and houses the crucible 110, the heater 120, the vapor-deposition drum 130, the scraper 141 and the particle guide 143. Incidentally, a pressure gauge (not shown) for measuring the pressure in the deposition chamber RM is disposed in the deposition chamber RM. As shown in FIG. 1, the collection portion 152 is a portion protruding outward from the side wall of the chamber body portion 151, and has a space communicating with the deposition chamber RM of the chamber body portion 151. As described above, the distal end portion of the particle guide 143 is located in the collection portion 152.

The raw material supply hopper 160 is a supply source of the silicon monoxide gas-generating raw material. As shown in FIG. 1, an outlet of the raw material supply hopper is connected to the raw material introducing pipe 170. In other words, the silicon monoxide gas-generating raw material Sr charged into the raw material supply hopper 160 is continuously supplied to the crucible 110 via the raw material introducing pipe 170 at an appropriate timing. The silicon monoxide gas-generating raw material Sr supplied to the crucible 110 becomes silicon monoxide gas. When the silicon monoxide gas-generating raw material Sr is continuously supplied to the crucible 110, the inert gas flows from the inert gas tank 161 to the raw material supply hopper 160 via the inert gas charging line 162.

The inert gas tank 161 is a supply source of the inert gas. As shown in FIG. 1, an outlet of the inert gas tank 161 is connected to the inert gas charging line 162. As described above, when the silicon monoxide gas-generating raw material Sr charged into the raw material supply hopper 160 is continuously supplied to the crucible 110, the inert gas flows from the inert gas tank 161 to the raw material supply hopper 160 via the inert gas charging line 162.

The inert gas charging line 162 is a pipe for flowing the inert gas in the inert gas tank 161 to the raw material supply hopper 160, and connects the raw material supply hopper 160 and the inert gas tank 161.

The raw material introducing pipe 170 is a nozzle having a round hole shape for continuously charging the silicon monoxide gas-generating raw material Sr which is charged into the raw material supply hopper 160 into the crucible 110, and is disposed so that the outlet faces upward in the central portion of the top plate portion of the crucible 110.

The collection container 180 is a container for collecting thin film pieces that have passed through the first valve VL1 and the second valve VL2.

The first valve VL1 and the second valve VL2 adjust the collection amount of thin film pieces into the collection container 180 by opening and closing, and are provided in the collection pipe 190 connecting the collection portion 152 of the chamber 150 and the collection container 180.

Hereinafter, a description will be given of a case where silicon oxide particles or metal element-containing silicon oxide particles used for a negative electrode material for a lithium ion secondary battery is finally manufactured from the silicon monoxide gas-generating raw material Sr by using the method for continuously generating silicon monoxide gas according to the embodiment of the present invention and the above-mentioned vapor-deposition apparatus 100.

First, the silicon monoxide gas-generating raw material Sr is charged into the raw material supply hopper 160. The silicon monoxide gas-generating raw material Sr is continuously charged into the crucible 110 in the deposition chamber RM from the raw material supply hopper 160 via the raw material introducing pipe 170. At this time, the inert gas is flowed from the inert gas tank 161 to the raw material supply hopper 160 via the inert gas charging line 162 in a turbulent flow, a laminar flow or a vortex flow. Incidentally, the flow rate of the inert gas is controlled so that the pressure in the deposition chamber RM becomes within the range of 0 Pa or more and 100 Pa or less until the continuous charge of the silicon monoxide gas-generating material Sr is completed and the silicon monoxide gas is not generated in the deposition chamber RM. As described above, the pressure in the deposition chamber RM is measured by the pressure gauge disposed in the deposition chamber RM. Incidentally, it is preferable that argon (Ar) is used as the inert gas.

Next, the silicon monoxide gas-generating raw material Sr charged into the crucible 110 in the deposition chamber RM is heated by the heater 120. The temperature in the deposition chamber RM influences the reaction rate of silicon monoxide. If the temperature is too low, the reaction rate becomes slow, and if the temperature is too high, there are concerns that side reaction due to melting of the silicon monoxide gas-generating material Sr will proceed, energy efficiency will decrease and so on. In addition, there is a concern that the temperature may lead to damage to the crucible 110. From this viewpoint, the temperature in the deposition chamber RM is preferably within a range of 1000° C. or more and 1600° C. or less, more preferably within a range of 1100° C. or more and 1500° C. or less, and particularly preferably within a range of 1100° C. or more and 1400° C. or less.

As described above, by heat-treating the silicon monoxide gas-generating raw material Sr, silicon monoxide gas is continuously generated from the silicon monoxide gas-generating raw material Sr in the crucible 110. The silicon monoxide gas is supplied to the vapor-deposition drum 130 through the gas guide Gg. Then, at this time, the vapor-deposition drum 130 is rotatably driven by a driving source. Incidentally, the temperature of the outer peripheral surface of the vapor-deposition drum 130 is set lower than the temperature in the deposition chamber RM. More specifically, the temperature is set lower than the condensation temperature of the silicon monoxide gas. With this setting, the silicon monoxide gas generated from the crucible 110 is vapor-deposited, deposited and accumulated on the outer peripheral surface of the rotating vapor-deposition drum 130. Then, a thin film is formed on the vapor-deposition drum 130. When the thin film on the vapor-deposition drum 130 comes into contact with the scraper 141, the thin film is scraped off from the vapor-deposition drum 130. Incidentally, the scraped off pieces of the thin film (active material particles) fall along the outer peripheral surface of the vapor-deposition drum 130 to the particle guide 143.

Thus, using the method for continuously generating silicon monoxide gas according to the embodiment of the present invention and the vapor-deposition apparatus 100 described above, it is possible to finally manufacture active material particles from the silicon monoxide gas-generating raw material Sr.

Incidentally, when the moisture content of the silicon monoxide gas-generating material Sr is high (for example, more than 0.6 wt %), a large amount of water vapor ($H_2O$) and a large amount of hydrogen ($H_2$) gas may be generated when the silicon monoxide gas-generating material Sr is heat-treated. If a large amount of water vapor ($H_2O$) and a large amount of hydrogen ($H_2$) are generated, the pressure in the deposition chamber RM may increase. For this reason, in this embodiment, the silicon monoxide gas-generating raw material Sr may be previously dry-treated. The moisture content of the silicon monoxide gas-generating raw material Sr after being dry-treated is preferably 0.6 wt % or less, preferably 0.3 wt % or less, and more preferably 0.1 wt % or less. Incidentally, examples of the dry-treatment method include heat-drying, reduced pressure drying and the like. When the silicon monoxide gas-generating raw material Sr is dry-treated by, for example, heat-drying, it is preferable that the silicon monoxide gas-generating raw material Sr is dry-treated within a range of 1 hour or more and 240 hours or less and within a range of 100° C. or more and 400° C. or less, and more preferably within a range of 4 hours or more and 120 hours or less and within a range of 200° C. or more and 350° C. or less. When the silicon monoxide gas-generating raw material Sr is dry-treated by, for example, reduced pressure drying, it is preferable that the silicon monoxide gas-generating raw material Sr is dry-treated within a range of 12 hours or more and 120 hours or less and under reduced pressure in which the pressure is controlled by a vacuum pump so as to be within a range of 10 Pa or more and 100 Pa or less, and more preferably within a range of 12 hours or more and 240 hours or less and under reduced pressure in which the pressure is controlled so as to be within a range of 0.1 Pa or more and 100 Pa or less. Incidentally, the silicon monoxide gas-generating raw material Sr after being dry-treated is preferably sealed or stored under vacuum.

Incidentally, it is preferable that the silicon monoxide gas-generating raw material Sr after being dry-treated is charged into the raw material supply hopper 160 so as not to be exposed to the atmosphere. This is because moisture in the atmosphere may adsorb to the silicon monoxide gas-generating raw material Sr after being dry-treated. Here, so that the silicon monoxide gas-generating raw material Sr after being dry-treated is not exposed to the atmosphere, for example, "a drying mechanism for drying the silicon monoxide gas-generating raw material Sr" and "a supply pipe for supplying the silicon monoxide gas-generating raw material Sr after being dry-treated to the raw material supply hopper 160" may be configured in the vapor-deposition apparatus 100

Incidentally, although the flow rate of the inert gas is controlled so that the pressure in the deposition chamber RM becomes within the range of 0 Pa or more and 100 Pa or less until the silicon monoxide gas-generating material Sr is not generated in the deposition chamber RM after the continuous charge of the silicon monoxide gas-generating material Sr is completed, at least one of the flow rate of the inert gas and the flow velocity of the inert gas may be controlled.

<Features of the Method for Continuously Generating Silicon Monoxide Gas According to the Embodiment of the Present Invention>

(1)

In the method for continuously generating silicon monoxide gas according to the embodiment of the present invention, the silicon monoxide gas-generating raw material Sr is continuously charged into the crucible 110 in the deposition chamber RM via the raw material introducing pipe 170 from the raw material supply hopper 160. At this time, the inert gas is flowed from the inert gas tank 161 to the raw material supply hopper 160 via the inert gas charging line 162. For this reason, in this method for continuously generating silicon monoxide gas, it is possible to prevent the silicon monoxide gas from flowing back into the raw material introducing pipe 170 and vapor-depositing in the raw material introducing pipe 170. In some cases, it is possible to prevent the silicon monoxide gas from flowing back into the raw material supply hopper 160 and vapor-depositing in the raw material supply hopper 160. For this reason, it is possible to prevent the silicon monoxide gas-generating raw material Sr from staying in the raw material introducing pipe 170 or the like. Therefore, in this method for continuously generating silicon monoxide gas, it is possible to prevent a decrease in yield of the silicon monoxide gas-generating raw material Sr.

(2)

In the method for continuously generating silicon monoxide gas according to the embodiment of the present invention, the flow rate of the inert gas is controlled so that the pressure in the deposition chamber RM becomes within the range of 0 Pa or more and 100 Pa or less until the continuous charge of the silicon monoxide gas generating material Sr is completed and the silicon monoxide gas is not generated in the deposition chamber RM. For this reason, in this method for continuously generating silicon monoxide gas, a reaction in which the silicon monoxide gas is generated is not inhibited, and silicon monoxide gas can be continuously generated.

EXAMPLES AND COMPARATIVE EXAMPLES

Hereinafter, examples and comparative examples will be described in order to describe the present invention in more detail, but the present invention is not limited to this example.

Example 1

Silicon monoxide (SiO) gas-generating raw material Sr (weight: 500 g, moisture content: 0.05 wt %) containing silicon dioxide ($SiO_2$) and silicon (Si) was used. Then, using the vapor-deposition apparatus 100 shown in FIG. 1, after charging the silicon monoxide gas-generating raw material Sr into the raw material supply hopper 160, the silicon monoxide gas-generating raw material Sr was continuously charged into the crucible 110 in the deposition chamber RM (temperature 1300° C.) at a charging rate of 4 g/min. At this time, argon (Ar) was flowed from the inert gas tank 161 to the material supply hopper 160 via the inert gas charging line 162. Then, the flow rate of argon (Ar) was controlled so that the pressure in the deposition chamber RM became within the range of 0 Pa or more and 100 Pa or less until the continuous charge of the silicon monoxide gas-generating material Sr was completed and the silicon monoxide gas was not generated. Incidentally, at this time, the pressure in the material supply hopper 160 was within the range of 5 Pa or more and 120 Pa or less. Then, when the silicon oxide particles were no longer manufactured, the weight of the silicon oxide particles in the collection container 180 was 470 g. From the above, the reaction rate (weight of the manufactured silicon oxide particles/weight of the silicon monoxide gas-generating raw material Sr×100) was 94%. Further, when the inside state of the raw material introducing pipe 170 was visually confirmed, the vapor-deposition was hardly observed.

Example 2

Silicon monoxide (SiO) gas-generating raw material Sr (weight: 500 g, moisture content: 0.05 wt %) containing lithium silicate ($Li_2Si_2O_5$) and silicon (Si) was used. Then, using the vapor-deposition apparatus 100 shown in FIG. 1, after charging the silicon monoxide gas-generating raw material Sr into the raw material supply hopper 160, the silicon monoxide gas-generating raw material Sr was continuously charged into the crucible 110 in the deposition chamber RM (temperature 1300° C.) at a charging rate of 4 g/min. At this time, argon (Ar) was flowed from the inert gas tank 161 to the material supply hopper 160 via the inert gas charging line 162. Then, the flow rate of argon (Ar) was controlled so that the pressure in the deposition chamber RM became within the range of 0 Pa or more and 100 Pa or less until the continuous charge of the silicon monoxide gas-generating material Sr was completed and the silicon monoxide gas was not generated. Incidentally, at this time, the pressure in the material supply hopper 160 was within the range of 5 Pa or more and 125 Pa or less. Then, when the metal-containing silicon oxide particles were no longer manufactured, the weight of the metal-containing silicon oxide particles in the collection container 180 was 462 g. From the above, the reaction rate (weight of the manufactured metal-containing silicon oxide particles/weight of the silicon monoxide gas-generating raw material Sr×100) was 92%. Further, when the inside state of the raw material introducing pipe 170 was visually confirmed, the vapor-deposition was hardly observed.

Comparative Example 1

Silicon monoxide (SiO) gas-generating raw material Sr (weight: 500 g, moisture content: 0.05 wt %) containing silicon dioxide ($SiO_2$) and silicon (Si) was used. Then, using the vapor-deposition apparatus 100 shown in FIG. 1, after charging the silicon monoxide gas-generating raw material Sr into the raw material supply hopper 160, the silicon monoxide gas-generating raw material Sr was continuously charged into the crucible 110 in the deposition chamber RM (temperature 1300° C.) at a charging rate of 4 g/min. In Comparative Example 1, the inert gas is not flowed from the inert gas tank 161 to the raw material supply hopper 160 via the inert gas charging line 162. Then, when the continuous charge of the silicon monoxide gas-generating raw material Sr was completed and the silicon oxide particles were no longer manufactured, the weight of the silicon oxide particles in the collection container 180 was 201 g. From the above, the reaction rate (weight of the manufactured silicon oxide particles/weight of the silicon monoxide gas-generating raw material Sr×100) was 40%. Further, when the inside state of the raw material introducing pipe 170 was visually confirmed, the vapor-deposition occurred, and the charge of the silicon monoxide gas-generating raw material Sr into the crucible 110 was inhibited.

Comparative Example 2

Silicon monoxide (SiO) gas-generating raw material Sr (weight: 500 g, moisture content: 0.05 wt %) containing lithium silicate ($Li_2Si_2O_5$) and silicon (Si) was used. Then, using the vapor-deposition apparatus 100 shown in FIG. 1, after charging the silicon monoxide gas-generating raw material Sr into the raw material supply hopper 160, the silicon monoxide gas-generating raw material Sr was continuously charged into the crucible 110 in the deposition chamber RM (temperature 1300° C.) at a charging rate of 4 g/min. In Comparative Example 2, the inert gas is not flowed from the inert gas tank 161 to the material supply hopper 160 via the inert gas charging line 162. Then, when the continuous charge of the silicon monoxide gas-generating raw material Sr was completed and the metal-containing silicon oxide particles were no longer manufactured, the weight of the metal-containing silicon oxide particles in the collection container 180 was 170 g. From the above, the reaction rate (weight of the manufactured metal-containing silicon oxide particles/weight of the silicon monoxide gas-generating raw material Sr×100) was 34%. Further, when the inside state of the raw material introducing pipe 170 was visually confirmed, the vapor-deposition occurred, and the charge of the silicon monoxide gas-generating raw material Sr into the crucible 110 was inhibited.

REFERENCE SIGNS LIST

100 Vapor-deposition apparatus
110 Crucible
120 Heater
130 Vapor-deposition drum
141 Scraper
143 Particle guide
150 Chamber
151 Chamber body portion
152 Collection portion
153 Exhaust pipe
160 Raw material supply hopper (Raw material supply unit)
161 Inert gas tank
162 Inert gas charging line
170 Raw material introducing pipe (Raw material supply unit)
180 Collection container
190 Collection pipe
Gg Gas guide
OP Opening
RM Deposition chamber (Reaction chamber)
Sr Silicon monoxide gas-generating material
VL1 First valve
VL2 Second valve

The invention claimed is:

1. A method for continuously generating silicon monoxide gas, comprising:
    continuously charging a silicon monoxide (SiO) gas-generating raw material through a raw material introducing pipe into a crucible within a reaction chamber while inert gas is flowed through the raw material supply unit so as to be directed toward the charging direction of the silicon monoxide gas-generating raw material;
    heating the silicon monoxide gas-generating raw material which was charged into the crucible to continuously generate silicon monoxide gas; and
    charging silicon monoxide gas-generating raw material in the raw material supply unit into the crucible when silicon monoxide gas-generating raw material is being heated in the crucible;
    wherein the raw material supply unit comprises a raw material supply hopper and the raw material introducing pipe;
    wherein an inert gas charging line delivers the inert gas to the raw material supply unit before the silicon monoxide gas-generating raw material enters the crucible through the raw material introducing pipe; and
    wherein the raw material supply hopper is positioned outside the reaction chamber and the raw material introducing pipe connects the raw material supply hopper to the crucible.

2. The method for continuously generating silicon monoxide gas according to claim 1, wherein a flow rate of the inert gas is controlled so that a pressure in the reaction chamber becomes 100 Pa or less.

3. The method for continuously generating silicon monoxide gas according to claim 1, wherein the inert gas is argon (Ar).

* * * * *